(12) United States Patent
Inamura et al.

(10) Patent No.: US 12,391,202 B2
(45) Date of Patent: Aug. 19, 2025

(54) CONTACT DETECTION APPARATUS FOR VEHICLE

(71) Applicant: SUBARU CORPORATION, Tokyo (JP)

(72) Inventors: Keita Inamura, Tokyo (JP); Hayato Aiuchi, Tokyo (JP); Yohei Tsukui, Tokyo (JP); Shiaki Higa, Tokyo (JP); Haruhiko Nagahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 386 days.

(21) Appl. No.: 18/111,392

(22) Filed: Feb. 17, 2023

(65) Prior Publication Data

US 2023/0286456 A1    Sep. 14, 2023

(30) Foreign Application Priority Data

Mar. 8, 2022  (JP) .................................. 2022-035477

(51) Int. Cl.
*B60R 19/48* (2006.01)
*B60R 21/0136* (2006.01)
*B60R 19/18* (2006.01)

(52) U.S. Cl.
CPC ........ *B60R 19/483* (2013.01); *B60R 21/0136* (2013.01); *B60R 2019/1873* (2013.01)

(58) Field of Classification Search
CPC ....... B60R 19/18; B60R 19/48; B60R 19/483; B60R 2019/1873; B60R 2019/186; B60R 21/013; B60R 21/0136; B60R 2021/01013; B60R 2021/003; B60R 2021/0051; B60R 2021/0053; B60R 2021/0055
See application file for complete search history.

(56) References Cited

U.S. PATENT DOCUMENTS

| | | | |
|---|---|---|---|
| 10,668,881 B2 * | 6/2020 | Yoshida | ................ B60R 19/483 |
| 2005/0200139 A1 * | 9/2005 | Suzuki | ................ B60R 21/0136 293/117 |
| 2009/0019940 A1 * | 1/2009 | Suzuki | ................ B60R 19/483 73/800 |
| 2013/0013156 A1 * | 1/2013 | Watanabe | ........... B60R 21/0136 701/45 |

(Continued)

FOREIGN PATENT DOCUMENTS

| | | |
|---|---|---|
| JP | 2016-055711 A | 4/2016 |
| JP | 2023130899 A * | 9/2023 |

*Primary Examiner* — Gregory A Blankenship
(74) *Attorney, Agent, or Firm* — MCGINN I.P. LAW GROUP, PLLC

(57) ABSTRACT

A contact detection apparatus includes a bumper beam, an absorber, a contact detection sensor, a tube holder, and a cover. The absorber is disposed in front of and adjacent to the bumper beam. The contact detection sensor includes a pressure tube and outputs a signal in accordance with a change in pressure of the pressure tube. The tube holder is a part of a front end of the absorber and has a groove holding the pressure tube therein. The cover is attached to a front end of the tube holder and includes a body covering a front face of the tube holder and a pressing member disposed in front of the pressure tube. An upper end of a rear face of the pressing member is disposed at a more backward position than a lower rear end of the pressing member.

4 Claims, 5 Drawing Sheets

(56) References Cited

U.S. PATENT DOCUMENTS

| | | | |
|---|---|---|---|
| 2016/0039376 A1* | 2/2016 | Narita | B60R 19/18 |
| | | | 293/4 |
| 2018/0265024 A1* | 9/2018 | Syvertsen | B60R 21/0136 |
| 2018/0272971 A1* | 9/2018 | Syvertsen | B60R 21/0136 |
| 2021/0268979 A1* | 9/2021 | Yanagisawa | B60R 21/0136 |
| 2023/0286456 A1* | 9/2023 | Inamura | B60R 19/48 |
| 2023/0288277 A1* | 9/2023 | Inamura | B60R 19/18 |
| 2023/0391282 A1* | 12/2023 | Yamamoto | B60R 19/023 |
| 2024/0109505 A1* | 4/2024 | Higa | B60R 19/483 |

\* cited by examiner

CONTACT DETECTION APPARATUS FOR VEHICLE

CROSS-REFERENCE TO RELATED APPLICATIONS

The present application claims priority from Japanese Patent Application No. 2022-035477 filed on Mar. 8, 2022, the entire contents of which are hereby incorporated by reference.

BACKGROUND

The disclosure relates to a contact detection apparatus for a vehicle.

Some vehicles are provided with contact detection sensors. The contact detection sensor is provided on a rear side of a bumper cover of the vehicle. The contact detection sensor detects whether a contact object in contact with the vehicle is a human. For example, Japanese Unexamined Patent Application Publication No. 2016-55711 discloses a structure to which a contact detection sensor for a vehicle is attached. The structure includes a shock absorbing member provided on a front side of a bumper beam. The shock absorbing member has, as a whole, a substantially U-shape that opens backward as seen in a vehicle width direction. The shock absorbing member has a groove on its front portion, and the groove holds a pressure tube therein. When the vehicle makes contact with a human, the pressure tube is compressed in a vertical direction, which causes a deformation of the shock absorbing member. This allows for detection of contact between the vehicle and the human. In contrast, when the vehicle makes contact with a contact object, such as a small animal, other than a human, the shock absorbing member deforms mainly at an upper portion and a lower portion, which suppresses a deformation of the pressure tube. This allows for detection of contact between the vehicle and the contact object other than a human.

SUMMARY

An aspect of the disclosure provides a contact detection apparatus for a vehicle. The contact detection apparatus includes a bumper beam, an absorber, a contact detection sensor, a tube holder, and a cover. The bumper beam extends in a width direction of the vehicle. The absorber is disposed in front of and adjacent to the bumper beam and extends in the width direction of the vehicle. The contact detection sensor includes a pressure tube and is configured to output a signal in accordance with a change in pressure of the pressure tube. The pressure tube extends in the width direction of the vehicle and is held by the absorber. The tube holder is a part of a front end of the absorber and has a groove that opens in a frontward direction of the vehicle and holds the pressure tube therein. The cover is attached to a front end of the tube holder and includes a body and a pressing member. The body covers a front face of the tube holder. The pressing member extends from the body in a backward direction of the vehicle and is disposed in front of the pressure tube. The upper end of a rear face of the pressing member is disposed at a more backward position than a lower end of the rear face of the pressing member in the backward direction of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
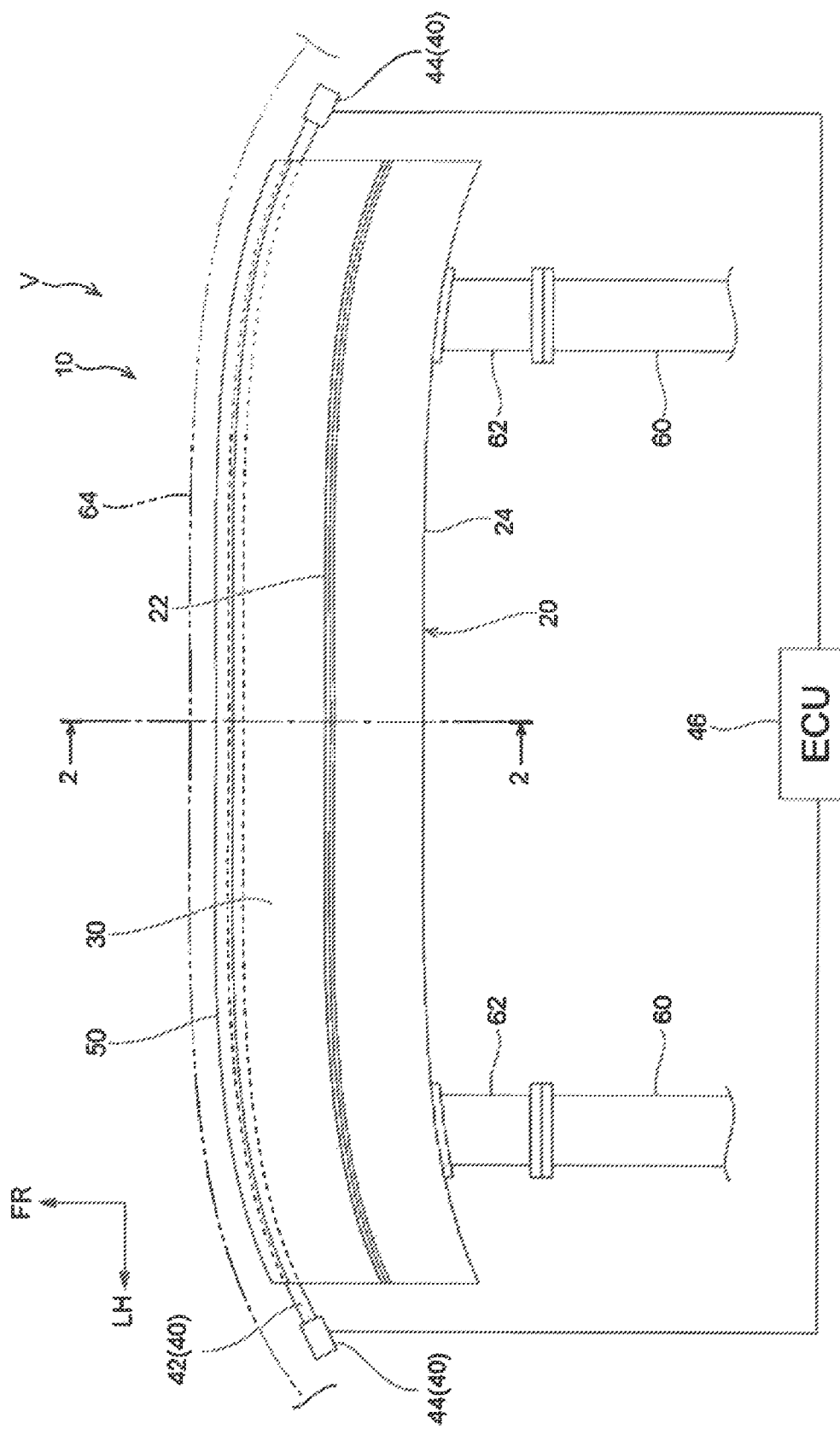
FIG. 1 is a schematic plan view of a contact detection apparatus according to one example embodiment of the disclosure.

When a vehicle makes contact with a human facing in a frontward direction of the vehicle, a bumper cover of the vehicle comes into contact with rear surfaces of the feet of the human, causing the human to bend the feet at the knees. In this case, a contact load inputted from the human to the vehicle is not enough large to appropriately compress a pressure tube in some cases. In such a case, a contact detection apparatus can fail to properly detect whether the contact object in contact with the vehicle is a human.

It is desirable to provide a contact detection apparatus for a vehicle that makes it possible to properly determine whether a contact object in contact with the vehicle is a human.

In the following, a contact detection apparatus 10 according to an example embodiment of the disclosure is described with reference to the accompanying drawings. In these drawings, arrows FR, UP, and LH indicate a frontward direction, an upward direction, and a leftward direction (one-side direction along a vehicle width direction) of a vehicle (e.g., automobile) V to which the contact detection apparatus 10 is applied, respectively. Hereinafter, explanations referring to directions are made on the basis of the upward, downward, frontward, backward, leftward, and rightward directions of the vehicle V unless otherwise noted. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
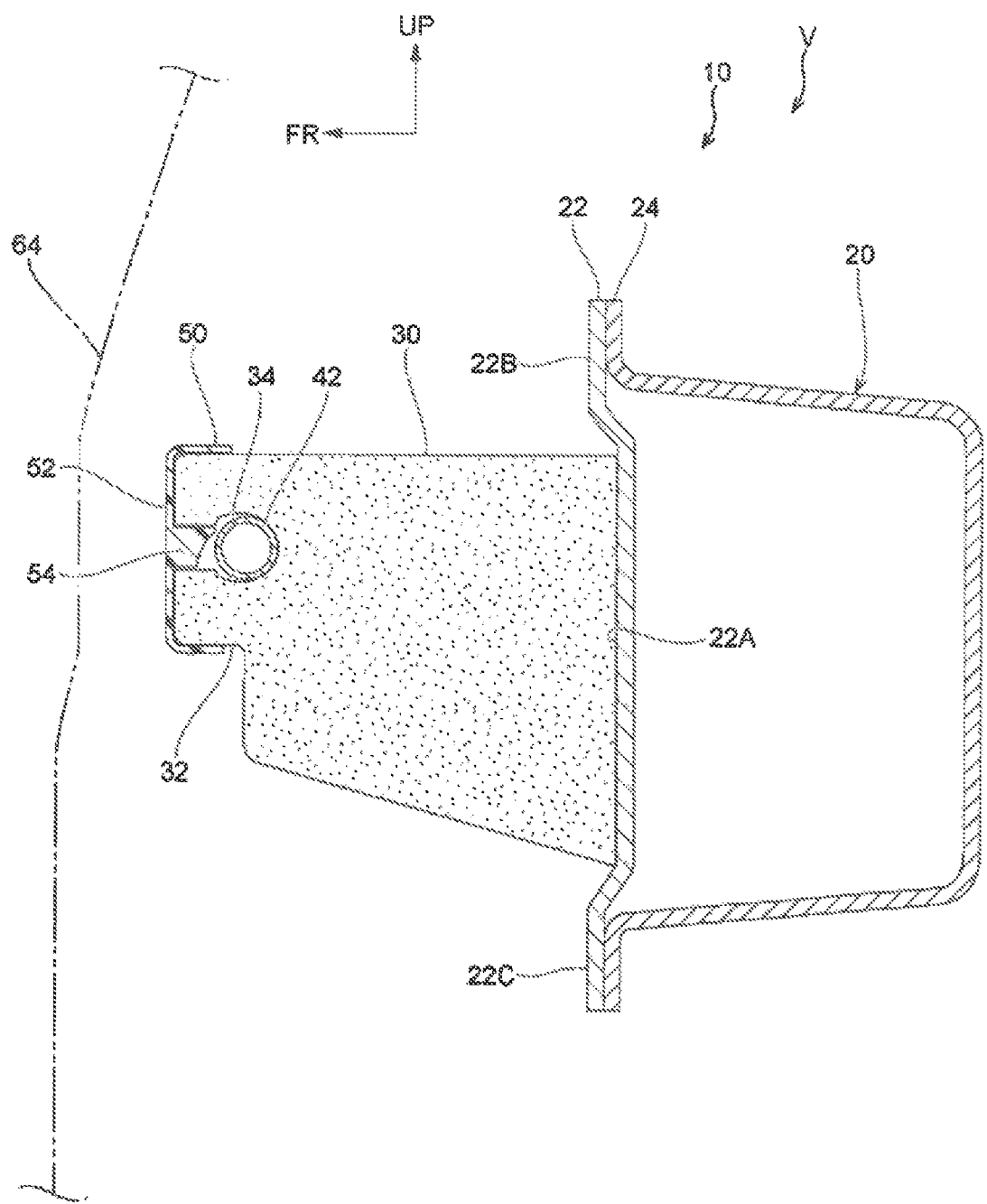
FIG. 2 is an enlarged left cross-sectional view of the contact detection apparatus illustrated in FIG. 1 taken along a line 2-2.

As illustrated in FIGS. 1 and 2, the contact detection apparatus 10 may be provided on a front end of the vehicle V and detect contact of the vehicle V with a contact object.

The contact detection apparatus 10 includes a bumper beam 20 which is a structural member of the vehicle V, an absorber 30 provided in front of the bumper beam 20, and a pressing cover 50 attached to the absorber 30. The contact detection apparatus 10 further includes a contact detection sensor 40. Described below are exemplary configurations of these components of the contact detection apparatus 10

[Bumper Beam 20]

The bumper beam 20 extends in the rightward-leftward direction or a vehicle width direction. The bumper beam 20 may have a substantially rectangular closed cross-sectional shape as seen in a longitudinal direction of the bumper beam 20. The bumper beam 20 may include a front panel 22 which is a front end of the bumper beam 20 and a rear panel 24 which is a rear portion of the bumper beam 20.

The front panel 22 may be a metal plate member having a thickness in the frontward-backward direction and extending in the rightward-leftward direction. The front panel 22 may have a recess 22A in a vertical middle portion of the front panel 22. The recess 22A may be recessed by one step in the backward direction. An upper portion of the front panel 22 above the recess 22A may correspond to a upper flange 22B, and a lower portion of the front panel 22 below the recess 22A may correspond to a lower flange 22C.

Like the front panel 22, the rear panel 24 may be a metal plate member extending in the rightward-leftward direction. The rear panel 24 may have a substantially hat-shape that opens in the frontward direction as seen in a longitudinal direction of the rear panel 24. The rear panel 24 may have an upper end joined to the upper flange 22B of the front panel 22, and a lower end joined to the lower flange 22C of the front panel 22.

Paired front side frames 60 that are structural members of the vehicle V may be provided behind the bumper beam 20. The front side frame 60 may extend in the frontward-backward direction. Opposite ends of the bumper beam 20 in the vehicle width direction may be joined to respective front ends of the front side frames 60 with respective crash boxes 62 interposed therebetween.

[Absorber 30]

The absorber 30 may include a resin foam material such as urethane foam. The absorber 30 may have a substantially elongated shape extending in the rightward-leftward direction or a longitudinal direction, and may be provided in front of and adjacent to the recess 22A of the bumper beam 20. The absorber 30 may have a substantially trapezoidal shape as seen in cross-sectional view in the longitudinal direction. For example, the absorber 30 may have a lower face inclining downward in the backward direction as seen in the rightward-leftward direction. The absorber 30 may have a rear face fixed to a front face of the recess 22A of the bumper beam 20. A bumper cover 64 may be provided in front of the absorber 30. The bumper cover 64 may be a front end of the vehicle V and cover the absorber 30 from in front of the absorber 30.

Figure 3:
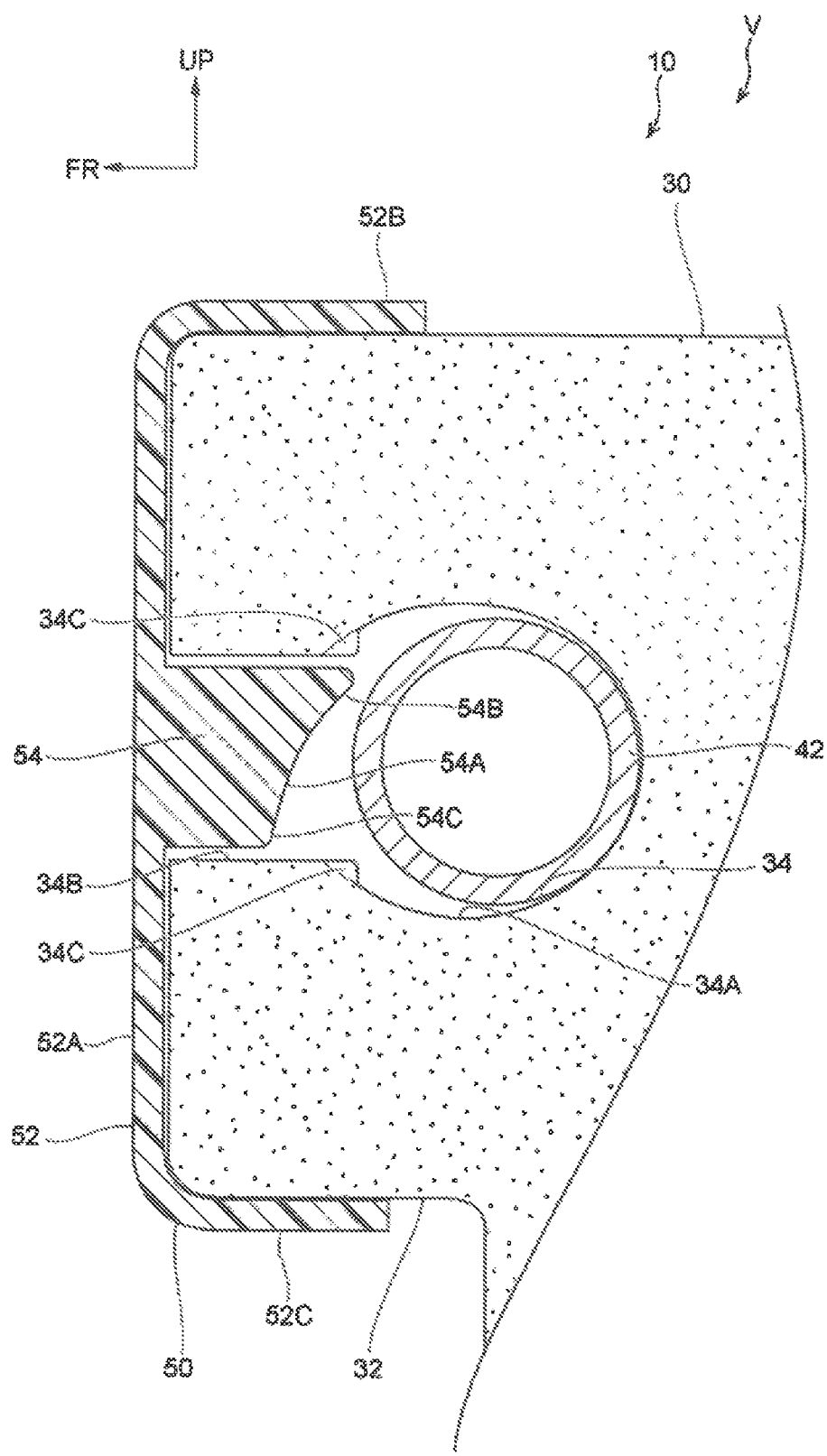
FIG. 3 is an enlarged cross-sectional view of a portion of an absorber including a tube holder illustrated in FIG. 2.

As illustrated in FIG. 3, a tube holder 32 is provided on a front end of the absorber 30. The tube holder 32 holds the pressure tube 42 to be described later, and the pressing cover 50 is attached to the tube holder 32. The tube holder 32 may overhang from an upper end of the absorber 30 in the frontward direction. A groove 34 that opens in the frontward direction may be provided at a vertical middle portion of the tube holder 32. The groove 34 may extend over the entire length of the absorber 30. The groove 34 may have a substantially inverted C-shape that opens in the frontward direction in left cross-sectional view. For example, the groove 34 may include a holding groove 34A and an opening groove 34B. The holding groove 34A may be a rear portion of the groove 34 and hold the pressure tube 42 therein. The opening groove 34B may be an opening of the groove 34. The holding groove 34A may have a substantially oval shape having a longitudinal length in the frontward-backward direction as seen in side cross-sectional view. The opening groove 34B may extend in the frontward-backward direction to communicate with the holding groove 34A. The holding groove 34A may have a vertical dimension larger than the width dimension (vertical dimension) of the opening groove 34B. The opening groove 34B may extend from a vertical middle portion of the holding groove 34A in the frontward direction. That is, the holding groove 34A and the opening groove 34B may be disposed at the same vertical position. Further, a pair of overhangs 34C may be provided on respective rear ends of the opening groove 34B. The overhangs 34C may overhang inward from the inner periphery of the holding groove 34A in the upward direction and the downward direction, respectively.

[Contact Detection Sensor 401]

The contact detection sensor 40 includes the pressure tube 42 held by the absorber 30, and a pressure sensor 44 that outputs a signal in accordance with a change in pressure of the pressure tube 42. In a broad sense, the pressure sensor 44 may be regarded as a pressure detector.

The pressure tube 42 may have an elongated shape having a longitudinal length in the rightward-leftward direction. The pressure tube 42 may be a hollow structure having a substantially annular cross-sectional shape. The pressure tube 42 is embedded in the holding groove 34A of the groove 34 and held by the tube holder 32 of the absorber 30. The pressure tube 42 may have a diameter lager than the width dimension of the opening groove 34B.

The pressure sensor 44 may be provided at each of opposite longitudinal ends of the pressure tube 42, and may be fixed to the body of the vehicle V at a non-illustrated position. The pressure sensor 44 may be electrically coupled to an ECU 46. In a broad sense, the ECU 46 may be regarded as a contact determination unit. When the pressure tube 42 deforms, the pressure sensor 44 may output a signal to the ECU 46 in accordance with a change in pressure inside the pressure tube 42.

On the basis of the signal outputted from the pressure sensor 44, the ECU 46 may calculate the value of the change in pressure inside the pressure tube 42, determine whether a value of the change in pressure is greater than a threshold, and determine whether a contact object in contact with the bumper cover 64 is a human or a contact object, such as a small animal, other than a human. For example, in a case where the value of the change in pressure inside the pressure tube 42 is greater than or equal to the threshold, the ECU 46 may determine that the contact object is a human, whereas in a case where the value of the change in pressure inside the pressure tube 42 is less than the threshold, the ECU 46 may determine that the contact object is an object other than a human.

[Pressing Cover 50]

The pressing cover 50 may include a resin material. The pressing cover 50 is attached to the tube holder 32 of the absorber 30. The pressing cover 50 includes a cover body 52 and a pressing member 54. In one embodiment, the pressing cover 50 may serve as a "cover". In one embodiment, the cover body 52 may serve as a "body" of the pressing cover 50.

The cover body 52 may have a substantially elongated plate shape extending in the rightward-leftward direction. The cover body 52 may have a substantially U-shape that opens in the backward direction in side cross-sectional view. For example, the cover body 52 may have a front wall 52A having a thickness in the frontward-backward direction, an upper wall 52B extending from an upper end of the front wall 52A in the backward direction, and a lower wall 52C extending from a lower end of the front wall 52A in the backward direction. The cover body 52 may be attached to the tube holder 32 by fitting the cover body 52 into the tube holder 32 from the front such that the tube holder 32 is held between the upper wall 52B and the lower wall 52C that are disposed on the respective ends of the tube holder 32 in the upward-downward direction. In a state where the cover body 52 is attached to the tube holder 32, the front wall 52A may be disposed in front of and adjacent to the tube holder 32.

The pressing member 54 may have a substantially elongated rib shape having a thickness in the upward-downward direction and extending in the rightward-leftward direction. The pressing member 54 may extend from a vertical middle portion of the cover body 52 in the backward direction. The pressing member 54 may have a thickness dimension smaller than the width dimension (vertical dimension) of the opening groove 34B of the absorber 30, and the pressing member 54 may be received in the opening groove 34B. That is, the pressing member 54 may be disposed in front of the pressure tube 42. A rear end of the pressing member 54 may be disposed more frontward than a rear end of the opening groove 34B so that the pressing member 54 is prevented from protruding more backward than the overhangs 34C of the holding groove 34A. In the example embodiment, the rear end of the pressing member 54 may be disposed at a slightly more frontward position than the rear end of the opening groove 34B. The pressing member 54 may be disposed at a vertical middle portion of the opening groove 34B, and a gap between the pressing member 54 and an upper side of the opening groove 34B and a gap between the pressing member 54 and a lower side of the opening groove 34B may be set to the same distance.

A rear face of the pressing member 54 may serve as a pressing face 54A. The pressing face 54A may have a curved shape extending more backward at a more upper portion in side cross-sectional view. In more detail, the pressing face 54A may be curved into a substantially arc shape defining a dent that faces obliquely downward in the backward direction in side cross-sectional view. Accordingly, an upper end 54B of the pressing face 54A is disposed at a more backward position than a lower end 54C of the pressing face 54A.

[Workings and Effects]

Now, workings and effects of the example embodiment of the disclosure are described together with exemplary operations of the contact detection apparatus 10 at the time of frontal contact between the vehicle V and a human and frontal contact between the vehicle V and a contact object other than a human.

Figure 4:
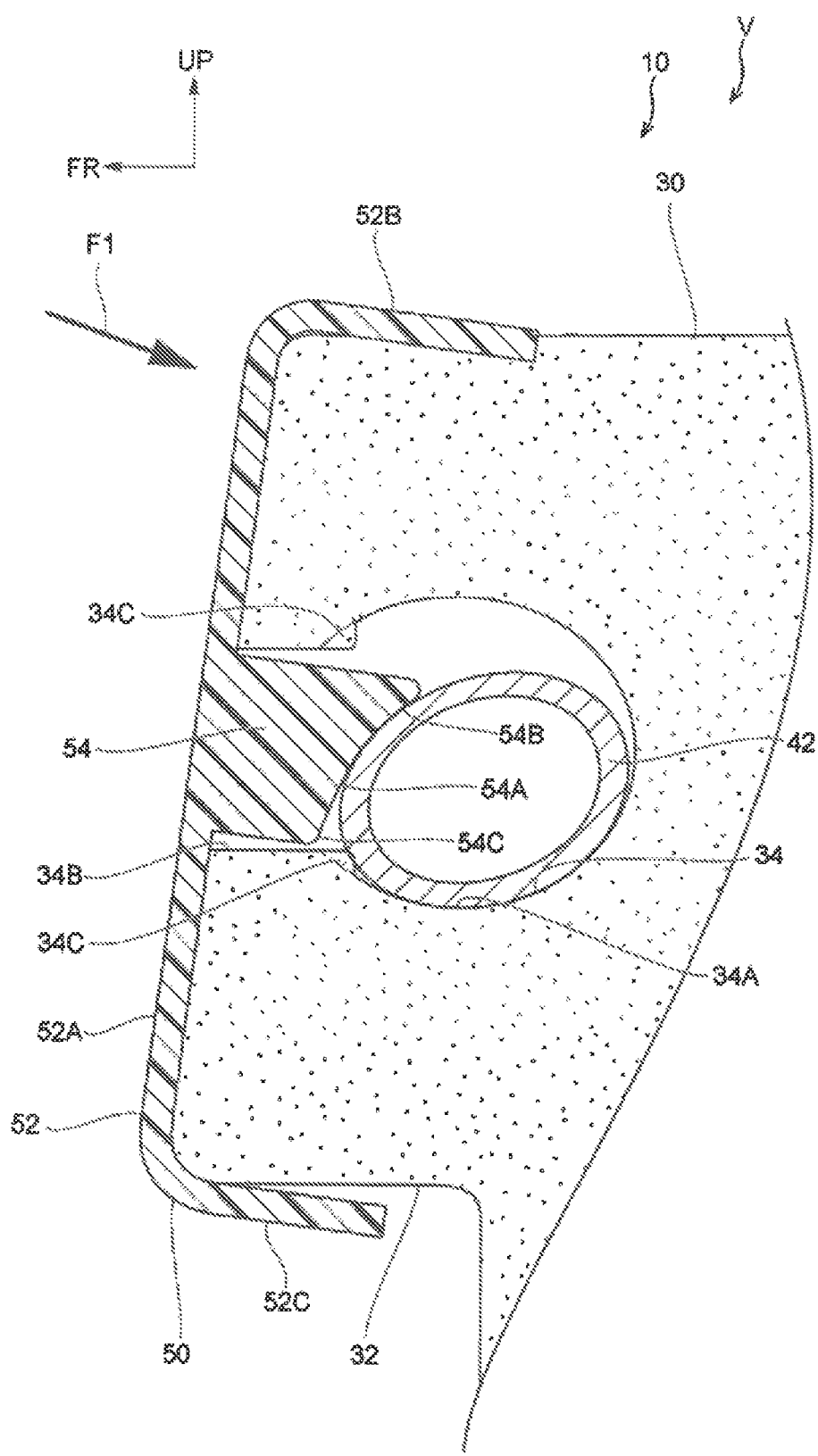
FIG. 4 is a cross-sectional diagram schematically illustrating an exemplary operation of the contact detection apparatus at the time of frontal contact between a vehicle and a human and corresponding to FIG. 3.

When the vehicle V makes frontal contact with a human, the bumper cover 64 may come into contact with the feet of the human, causing the human to fall onto the hood of the vehicle V. In this case, as illustrated in FIG. 4, a contact load F1 may be mainly applied obliquely downward in the backward direction to the bumper cover 64 and an upper portion of the pressing cover 50 attached to the front end (the tube holder 32) of the absorber 30. When the contact load F1 is applied to the upper portion of the pressing cover 50, the pressing cover 50 may be inclined obliquely downward in the backward direction and displaced in the backward direction. Thus, the pressing member 54 of the pressing cover 50 may be inclined and displaced in the backward direction inside the opening groove 34B of the absorber 30. The upper end 54B of the pressing face 54A of the pressing member 54 may be thereby brought into contact with a front portion of the pressure tube 42 so that the pressing member 54 is pressed against the pressure tube 42. When the pressing cover 50 is further displaced in the backward direction, substantially the entirety of the pressing face 54A may be brought into contact with an outer surface of the pressure tube 42 so that the pressing face 54A is pressed against the pressure tube 42. The pressure tube 42 may be thereby compressed and deformed, resulting in a change in pressure inside the pressure tube 42. The pressure sensor 44 may output a signal in accordance with the change in pressure inside the pressure tube 42 to the ECU 46. On the basis of the signal, the ECU 46 may detect that the contact object is a human.

Figure 5:
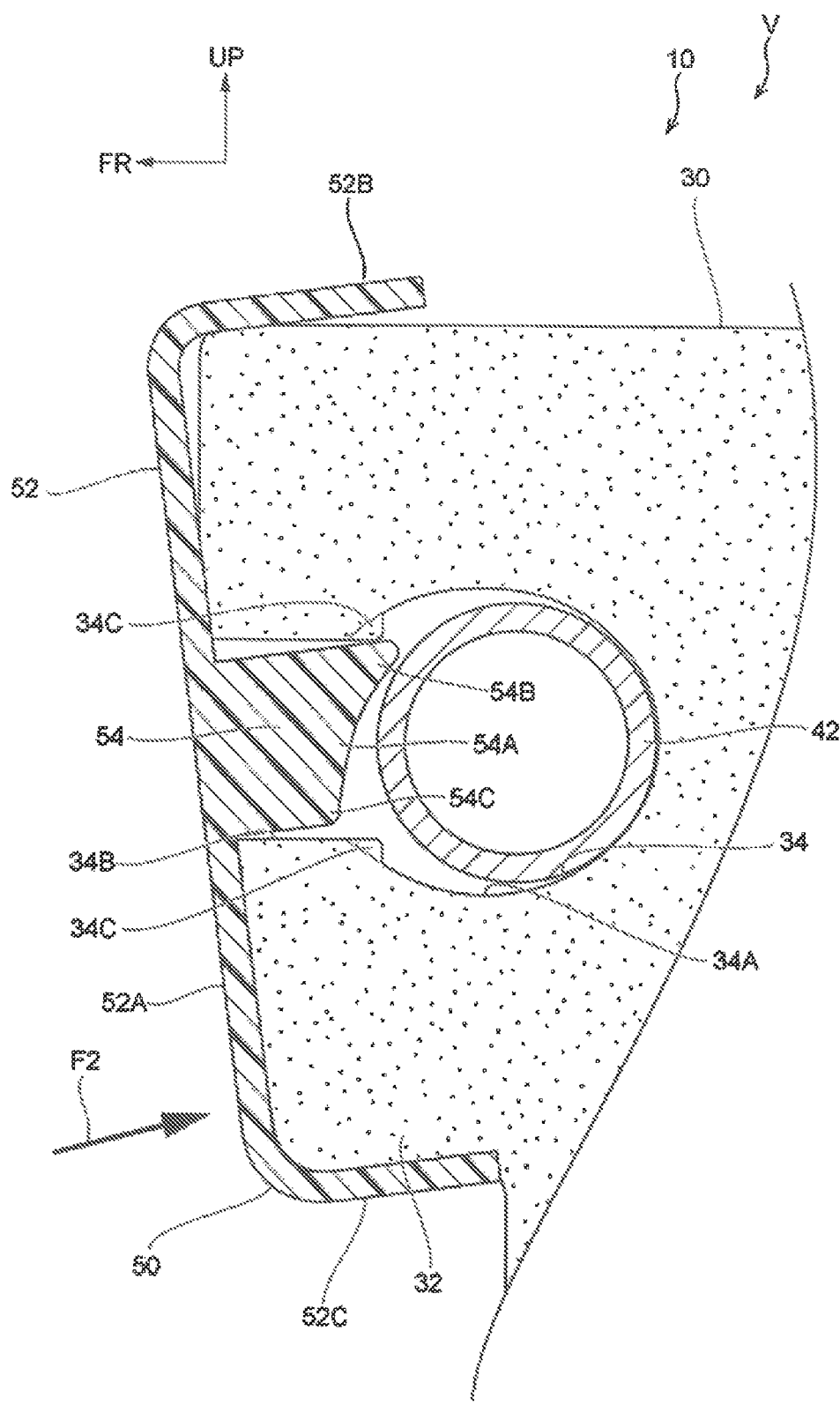
FIG. 5 is a cross-sectional diagram schematically illustrating an exemplary operation of the contact detection apparatus at the time of frontal contact between a vehicle and a contact object other than a human and corresponding to FIG. 3.

In contrast, when the vehicle V makes frontal contact with a contact object, such as a small animal, other than a human, a lower portion of the bumper cover 64 may come into contact with the contact object. In this case, as illustrated in FIG. 5, a contact load F2 may be mainly applied obliquely upward in the backward direction to the bumper cover 64 and a lower portion of the pressing cover 50 attached to the front end (the tube holder 32) of the absorber 30. When the contact load F2 is applied to the lower portion of the pressing cover 50, the pressing cover 50 may be inclined obliquely downward in the frontward direction. Thus, the pressing member 54 of the pressing cover 50 may be inclined in the frontward direction inside the opening groove 34B of the absorber 30. That is, as seen from the left side, the pressing face 54A may move in a counterclockwise direction, which moves the upper end 54B away from the pressure tube 42 in the frontward direction and moves the lower end 54C closer to the pressure tube 42 in the backward direction. In this example, the lower end 54C of the pressing face 54A of the pressing member 54 may be disposed at a more frontward position than the upper end 54B of the pressing face 54A of pressing member 54. That is, the lower end 54C of the pressing face 54A may be disposed more distant from the pressure tube 42 in the frontward direction than the upper end 54B is. This helps to prevent the pressing face 54A from coming into contact with the pressure tube 42 even when the lower end 54C is displaced closer to the pressure tube 42 in the backward direction. In other words, the pressing member 54 is prevented from easily pressing the pressure tube 42. Accordingly, the change in pressure inside the pressure tube 42 may be small when the vehicle V makes contact with a contact object other than a human. On the basis of the small change in pressure inside the pressure tube 42, the ECU 46 may detect that the contact object is an object, such as a small animal, other than a human.

According to the contact detection apparatus 10 of the example embodiment described above, the pressure tube 42 is received in the groove 34 of the tube holder 32 which is a part of the front end of the absorber 30, and the pressing cover 50 is attached to the front end of the tube holder 32. The pressing member 54 of the pressing cover 50 is disposed inside the opening groove 34B of the groove 34 and disposed in front of the pressure tube 42. The upper end 54B of the pressing face 54A of the pressing member 54 is disposed more backward than the lower end 54C of the pressing face 54A. In other words, the lower end 54C of the pressing face 54A is disposed more distant from the pressure tube 42 in the frontward direction than the upper end 54B is. Accordingly, as described above, when the vehicle V makes contact with a human, the upper end 54B of the pressing face 54A of the pressing cover 50 may be inclined in the backward direction and brought into contact with the pressure tube 42. Thus, the pressing face 54A may be appropriately pressed against the pressure tube 42. In contrast, when the vehicle V makes contact with a contact object other than a human, the pressing face 54A of the pressing cover 50 inclined in the frontward direction is prevented from easily coming into contact with the pressure tube 42. As a result, the pressing face 54A is prevented from easily pressing the pressure tube 42. Accordingly, when the vehicle V makes contact with a human, the pressure tube 42 may be appropriately deformed, and the deformation of the pressure tube 42 may be large. In contrast, when the vehicle V makes contact with a contact object, such as a small animal, other than a human, the deformation of the pressure tube 42 may be small. Thus, according to the contact detection apparatus 10 of the foregoing example embodiment, it is possible to properly detect whether the contact object in contact with the vehicle V is a human.

Further, the pressing face 54A of the pressing member 54 may be curved into an arc shape defining a dent that faces in the backward direction as seen in the vehicle width direction. For example, the pressing face 54A may have an arc shape that opens obliquely downward in the backward direction as seen in the vehicle width direction. Such a pressing face 54A may be pressed against the pressure tube 42 when the vehicle V makes contact with a human. Accordingly, it is possible to effectively compress the pressure tube 42 by the pressing face 54A.

The groove 34 may include the holding groove 34A and the opening groove 34B. The holding groove 34A may receive the pressure tube 42 therein, and the opening groove 34B may be the opening of the holding groove 34A. The opening groove 34B may have the overhangs 34C at the rear ends. The overhangs 34C may overhang inside the holding groove 34A. Accordingly, the pressing face 54A of the pressing member 54 may be disposed in front of and adjacent to the pressure tube 42 while the pressing member 54 is disposed inside the opening groove 34B. Thus, when the vehicle V makes frontal contact with a human, the pressure tube 42 may be appropriately pressed by the upper end 54B of the pressing face 54A inclined in the backward direction. In contrast, when the vehicle V makes frontal contact with a contact object other than a human, the rear end of the upper face of the pressing cover 50 inclined in the frontward direction may be brought into contact with the overhang 34C provided at the upper side of the opening groove 34B. This helps to prevent the pressing member 54 from inclining in the frontward direction and prevents the lower end 54C of the pressing face 54A from easily displaced toward the pressure tube 42. Accordingly, when the vehicle V makes contact with a contact object other than a human, it is possible to further prevent the pressing member 54 from easily pressing the pressure tube 42.

Although the pressing face 54A of the pressing member 54 may be curved into an arc shape as seen in the vehicle width direction in the foregoing example embodiment, the shape of the pressing face 54A is not limited to this example. For example, although not illustrated, the pressing face 54A may have steps such that the upper end 54B of the pressing face 54A is disposed more backward than the lower end 54C of the pressing face 54A. Alternatively, for example, the pressing face 54A may be a straight inclined surface extending more backward at a more upper portion such that the upper end 54B of the pressing face 54A is disposed more backward than the lower end 54C of the pressing face 54A as seen in the vehicle width direction.

In the foregoing example embodiment, the gap between the pressing member 54 and the upper side of the opening groove 34B and the gap between the pressing member 54 and the lower side of the opening groove 34B may be set to the same distance. However, the gap between the pressing member 54 and the lower side of the opening groove 34B may be set to be greater than the gap between the pressing member 54 and the upper side of the opening groove 34B by, for example, shifting the lower surface of the opening groove 34B to a lower position than that in the foregoing example embodiment. In this case, when the vehicle V makes contact with a human, the pressing member 54 of the pressing cover 50 inclined in the backward direction is prevented from easily interfering with the lower surface of the opening groove 34B. Accordingly, when the vehicle V makes contact with a human, it is possible to appropriately incline the pressing cover 50 in the backward direction so that the pressure tube 42 is compressed by the pressing member 54 of the pressing cover 50.

In the foregoing example embodiment, the opening groove 34B may extend from the vertical middle portion of the holding groove 34A in the frontward direction. That is, the holding groove 34A and the opening groove 34B may be disposed at the same vertical position. However, the vertical position of the opening groove 34B with respect to the holding groove 34A may be changed as desired. For example, the vertical position of the upper side of the opening groove 34B may be shifted upward from the vertical middle portion of the holding groove 34A. In this case, as the opening groove 34B is shifted to a more upward position, the pressing member 54 of the pressing cover 50 may be disposed more upward than in the foregoing example embodiment and disposed at a position in front of and obliquely above the pressure tube 42. Accordingly, when the vehicle V makes contact with a human, it is possible to effectively press the pressure tube 42 by the pressing member 54 inclined in the backward direction.

Note that the term "contact" used hereinabove may be used interchangeably with the term "collision". Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A contact detection apparatus for a vehicle, the contact detection apparatus comprising:
    a bumper beam extending in a width direction of the vehicle;
    an absorber disposed in front of and adjacent to the bumper beam and extending in the width direction of the vehicle;
    a contact detection sensor including a pressure tube and configured to output a signal in accordance with a change in pressure of the pressure tube, the pressure tube extending in the width direction of the vehicle and being held by the absorber;
    a tube holder comprising a part of a front end of the absorber and having a groove that opens in a frontward direction of the vehicle and holds the pressure tube therein; and a cover attached to a front end of the tube holder and comprising a body and a pressing member, the body covering a front face of the tube holder, the pressing member extending from the body in a backward direction of the vehicle and being disposed in front of the pressure tube, wherein an upper end of a rear face of the pressing member is disposed at a more backward position than a lower end of the rear face of the pressing member in the backward direction of the vehicle.

2. The contact detection apparatus according to claim 1, wherein the rear face of the pressing member is curved into an arc shape defining a dent that faces in the backward direction of the vehicle as seen in the width direction of the vehicle.

3. The contact detection apparatus according to claim 1, wherein the groove comprises a holding groove receiving the pressure tube, and an opening groove comprising an opening of the groove and extending in the frontward direction and the backward direction of the vehicle as seen in the width direction of the vehicle, wherein the opening groove has an overhang at a rear end of the opening groove, the overhang overhanging inside the holding groove.

4. The contact detection apparatus according to claim 2, wherein the groove comprises a holding groove receiving the pressure tube, and an opening groove comprising an opening of the groove and extending in the frontward direction and the backward direction of the vehicle as seen in the width direction of the vehicle, wherein the opening groove has an overhang at a rear end of the opening groove, the overhang overhanging inside the holding groove.

\* \* \* \* \*